June 29, 1943.   E. M. SCHANTZ   2,322,956
YARN CONTROL DEVICE
Filed Dec. 29, 1941   5 Sheets-Sheet 1

INVENTOR
EDWIN M. SCHANTZ
By Toulmin & Toulmin
ATTORNEYS

June 29, 1943.  E. M. SCHANTZ  2,322,956
YARN CONTROL DEVICE
Filed Dec. 29, 1941  5 Sheets-Sheet 2

INVENTOR
EDWIN M. SCHANTZ.
BY Toulmin & Toulmin
ATTORNEYS

June 29, 1943.  E. M. SCHANTZ  2,322,956
YARN CONTROL DEVICE
Filed Dec. 29, 1941  5 Sheets-Sheet 3
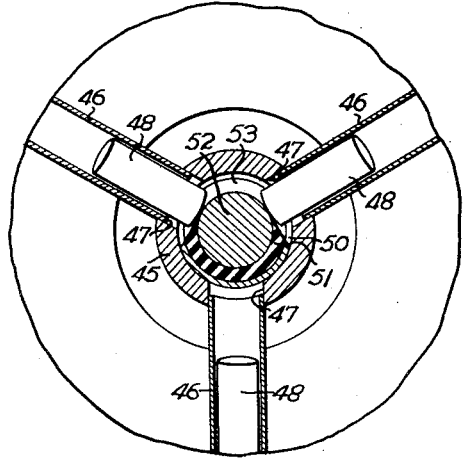
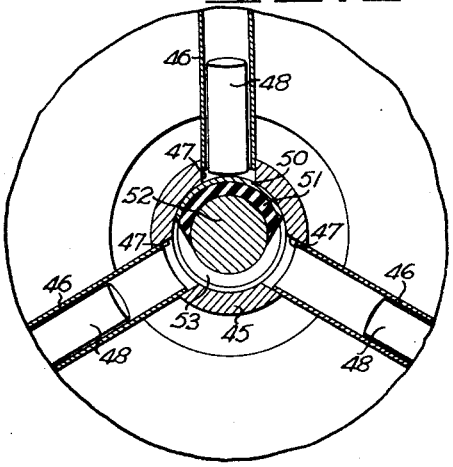
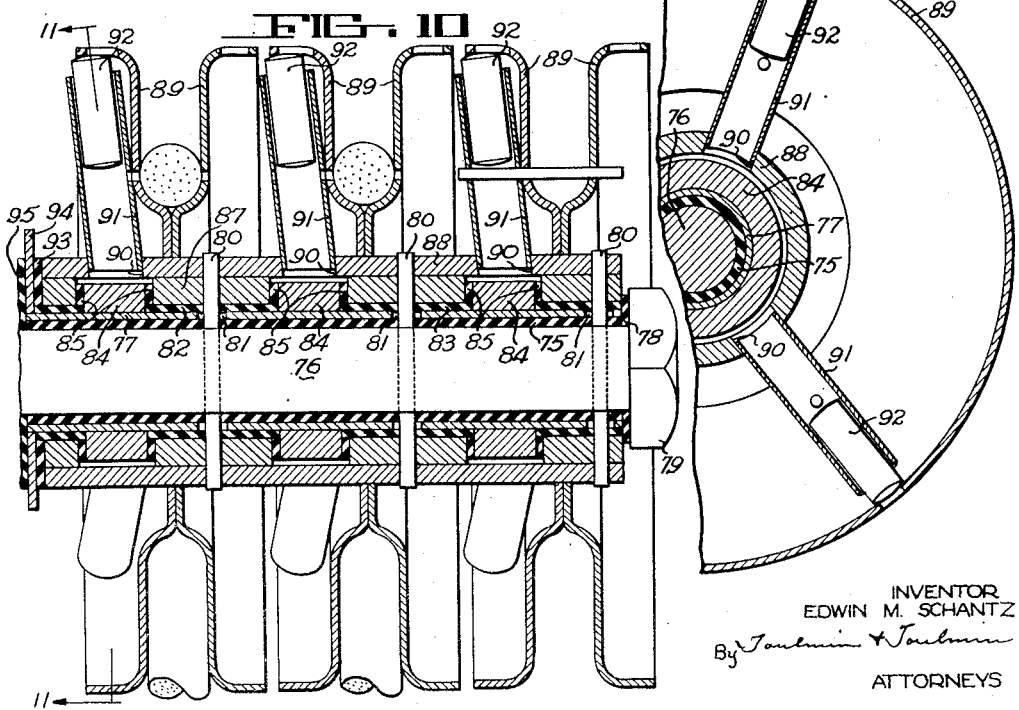
INVENTOR
EDWIN M. SCHANTZ
ATTORNEYS June 29, 1943.  E. M. SCHANTZ  2,322,956
YARN CONTROL DEVICE
Filed Dec. 29, 1941    5 Sheets-Sheet 4
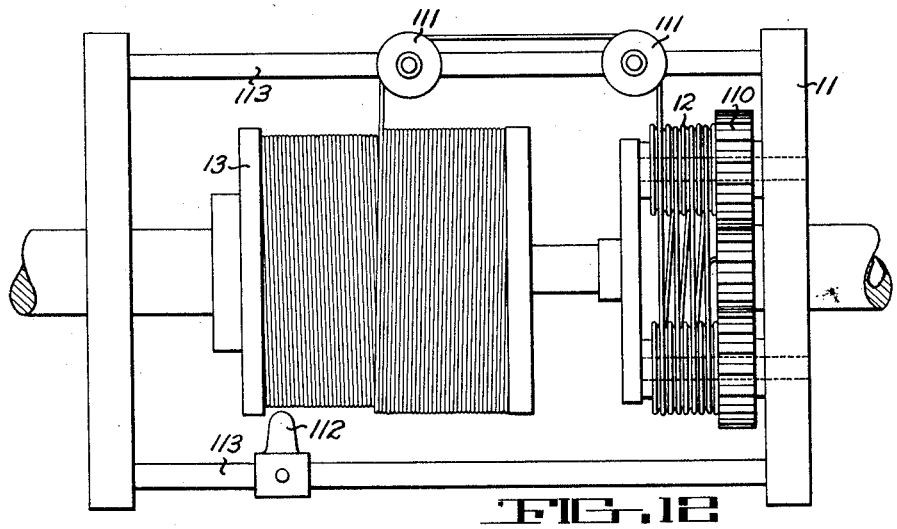
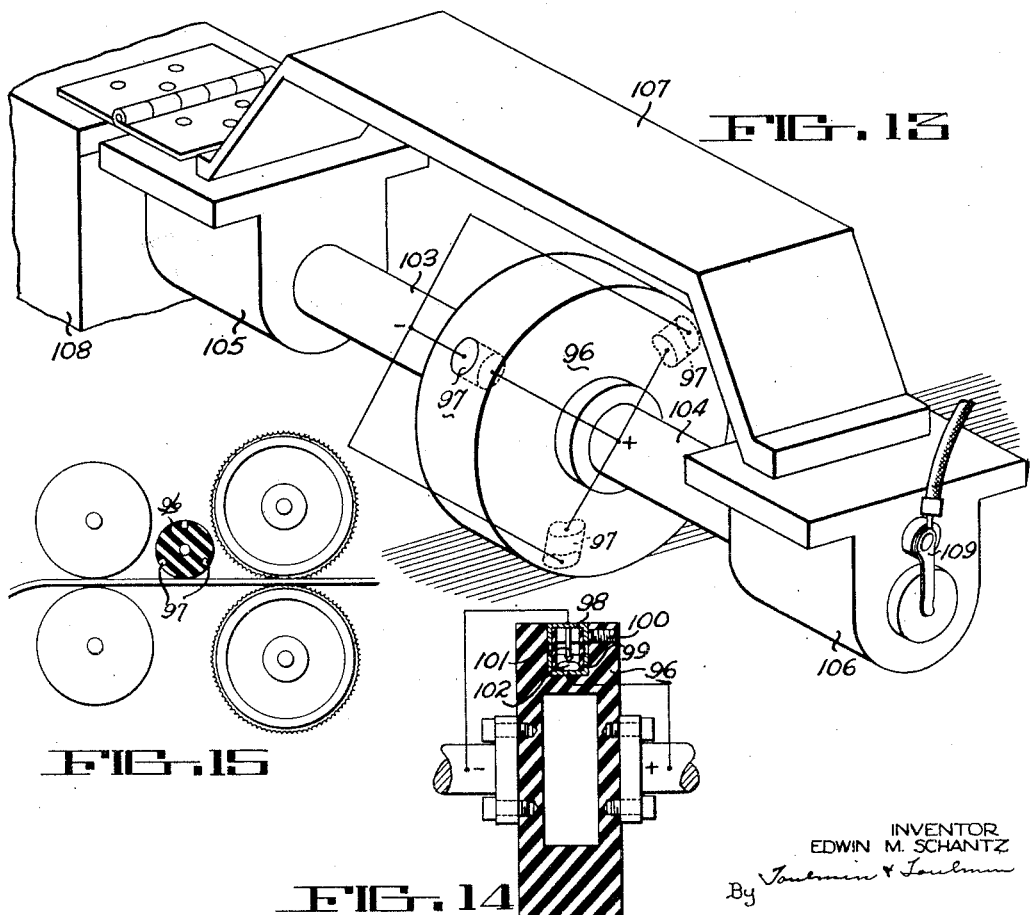
INVENTOR
EDWIN M. SCHANTZ
ATTORNEYS June 29, 1943.  E. M. SCHANTZ  2,322,956
YARN CONTROL DEVICE
Filed Dec. 29, 1941  5 Sheets-Sheet 5
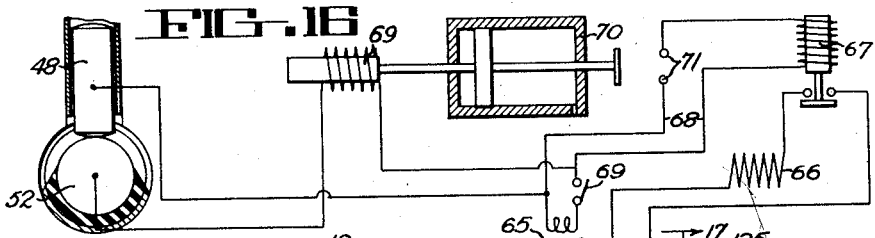
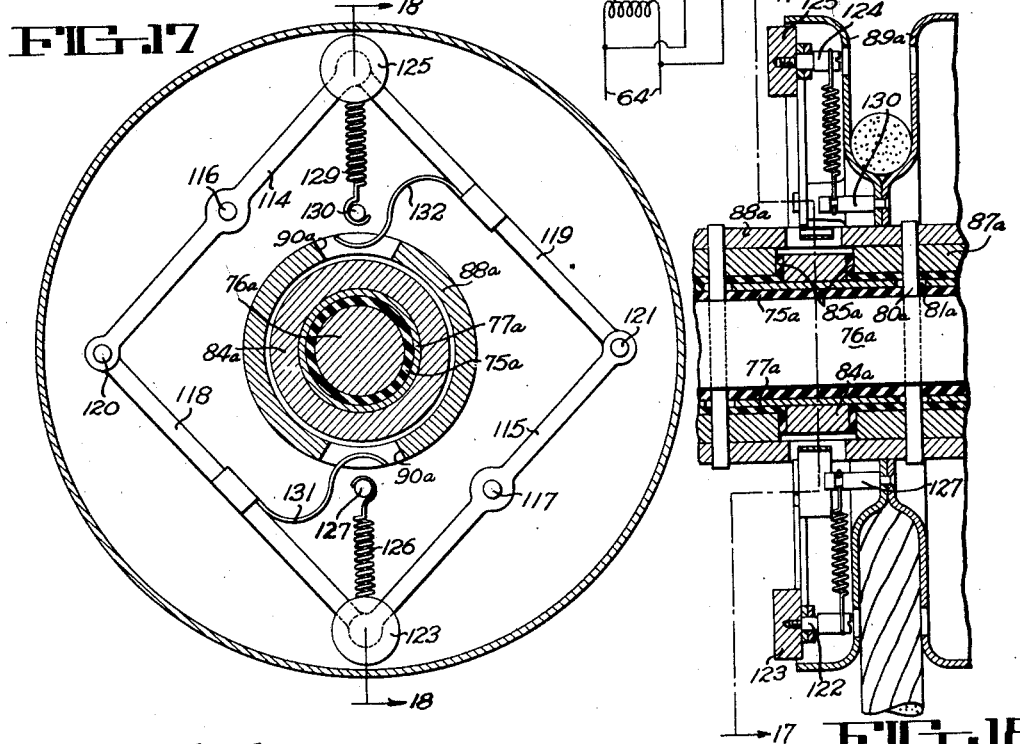
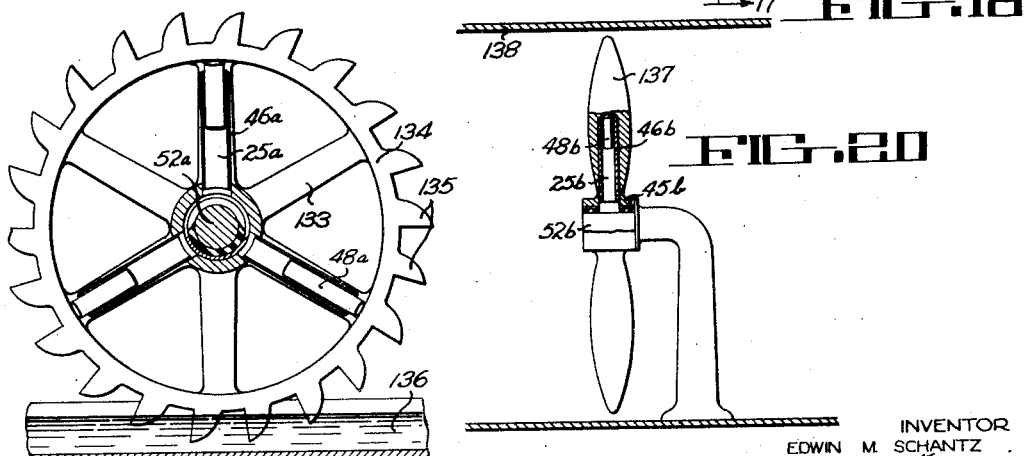
INVENTOR
EDWIN M. SCHANTZ
By Toulmin & Toulmin
ATTORNEYS Patented June 29, 1943

2,322,956

UNITED STATES PATENT OFFICE 2,322,956

YARN CONTROL DEVICE

Edwin M. Schantz, Xenia, Ohio, assignor to The Hooven & Allison Company, Xenia, Ohio, a corporation of Ohio Application December 29, 1941, Serial No. 424,759

16 Claims. (Cl. 57—80)

This invention relates to a speed sensitive device for controlling a machine in response to the flow of a substance to or from the machine.

The speed sensitive device of this invention is responsive to the speed of flow of a substance to a machine or other apparatus. As long as the substance flows to the apparatus at a predetermined rate, the speed sensitive device is inoperative to the extent that it performs no function with regard to the machine or apparatus being fed with the substance. However, if the rate of flow of the substance to the apparatus should fall below the predetermined rate for any cause whatever the speed sensitive device will operate to stop the apparatus or the machine.

The speed sensitive device of this invention can be used in any apparatus and in any location in the apparatus wherein it is desirable to sense the speed of flow of a substance through the machine or apparatus so that if the flow of the substance should fall below its predetermined rate or should stop entirely the speed responsive device will stop the apparatus.

Particularly, the invention relates to a device for controlling the operation of a cordage machine wherein it is desirable to maintain the flow of fibers to the machine at a predetermined rate and to stop the machine if the flow of fibers should be below the predetermined rate or should stop for any reason. The apparatus of this invention can be used upon any of the usual machines used in cordage manufacture, such as carding machines, drawing frames, forming and twisting machines and others.

An object of the invention is to provide a device, sensitive to the flow of a substance to a machine, which will stop the machine if the flow of the substance is below a predetermined rate or should halt entirely.

Another object of the invention is to provide a device, sensitive to the flow of a substance to a machine, which is independent of the machine for controlling the operation of the machine when the flow of substance changes from that normally desired.

Another object of the invention is to provide a speed sensitive device which is responsive solely to the flow of a substance to or from or through a machine for stopping the machine if the flow of the substance is below a normal predetermined speed.

Another object of the invention is to provide an electric controller responsive to the flow of a substance which normally maintains open circuit as long as the substance flows at a predetermined rate, and which closes circuit only when the rate of flow of the substance is below normal.

Another object of the invention is to provide a centrifugally operated electric controller for performing the operation of the foregoing object.

Another object of the invention is to provide a controller for electric current which closes circuit only when a moving member falls below a predetermined speed or stops.

Another object of the invention is to provide an electric controller for a cordage machine which will stop the machine if the flow of fibers to the machine fall below a predetermined rate of movement, or should stop entirely.

Another object of the invention is to provide an electric controller for a cordage machine which is responsive to the flow of fibers to or through the machine for stopping the machine if the flow of fibers varies from the normal flow.

Another object of the invention is to provide a centrifugally operated controller for electric current which is responsive to the flow of any substance for normally maintaining open circuit as long as the substance flows at a normal speed but which will close circuit when the flow of the substance falls below a normal speed.

Further objects and advantages will become apparent from the drawings and the following description.

In the drawings:

Figure 7 is a transverse cross-sectional view similar to Figure 4 showing the location of the contact elements to maintain continuous electric circuit.

Figure 8 is a transverse cross-sectional view similar to Figure 4 showing the position of the circuit breaking insulating member for locking the device out of effective operation.

Figure 9 is a perspective elevational view of the sleeves upon which the sheaves rotate showing the manner in which they are interlocked.

Figure 10 is a longitudinal cross-sectional view of a modified structure of the speed sensitive device.

Figure 11 is a transverse cross-sectional view taken substantially along line 11—11 of Figure 10.

Figure 12 is an elevational view of the flyer and capstan of a cordage machine showing the manner in which a full bobbin of cord will cause operation of the speed sensitive device to stop the machine.

Figure 13 is a perspective elevational view of the controller of this invention as applied to a control of the sliver entering a spinner or jenny.

Figure 14 is a transverse cross-sectional view of the speed sensitive device shown in Figure 13, and shows a modified structure of the speed sensitive device.

Figure 15 is a diagrammatic view representing the application of the speed sensitive device of Figure 14 to a drawing frame.

Figure 16 is a schematic electrical system including a dashpot delay device for reducing the sensitivity of the speed sensitive device.

Figure 17 is a transverse cross-sectional view taken along line 17—17 of Figure 18.

Figure 18 is a longitudinal cross-sectional view taken along line 18—18 of Figure 17.

Figure 19 is an elevational view of a wheel driven by a liquid showing the speed sensitive device of this invention applied thereto, the speed sensitive device being shown in cross-section.

Figure 20 is an elevational view of a propeller fan, partially in cross-section, showing the speed sensitive device applied thereto.

Figure 1:
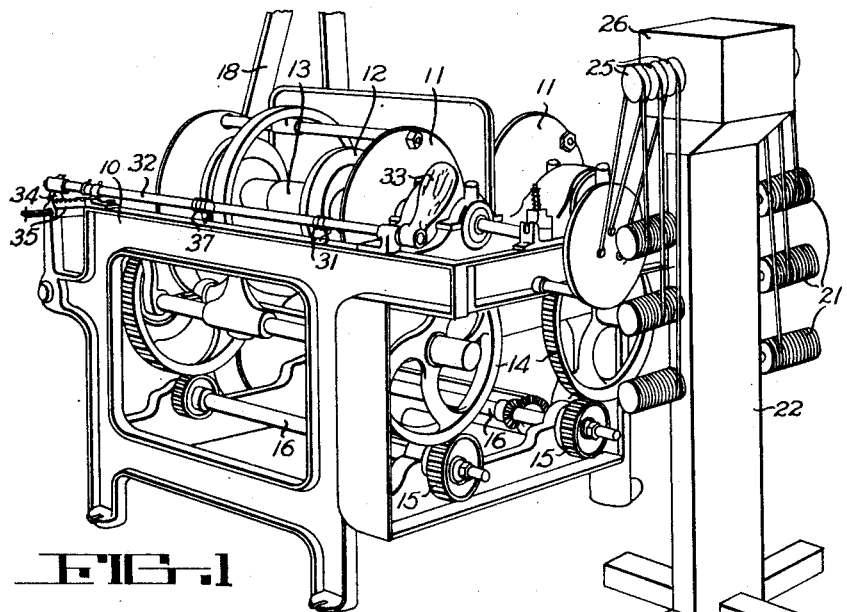
Figure 1 is a perspective elevational view of a twisting machine for manufacturing rope to which this invention is applied.

The description of the invention in this specification will show the application of the speed sensitive device to a former and twister for manufacturing rope or other cordage. In this application of the invention the speed sensitive device is responsive to the rate of movement of the cords to the former and twister. As long as the rate of movement of the cords remains at a predetermined speed, the speed sensitive device performs no function upon the machine. However, if any one of the cords entering the machine should slow down from its normal speed of movement or should break for any cause whatever the speed sensitive device will immediately stop the machine.

There are a number of faults that can occur in a former and twister to cause the rate of movement of the individual cords to be reduced from normal, any one of which will stop the machine until the trouble is corrected. When the end of a string or a cord runs off the supply bobbin for the former and twister, or when the cord breaks, the speed sensitive device will stop the machine. Also, if the rope inside the machine should break the cords will no longer be drawn through the machine and the machine will therefore be stopped. When a bobbin in the machine is filled an added resistance to the rotation of the bobbin caused by the layers of rope or cord engaging a friction member will reduce the speed of feeding the cords to the machine and therefore the speed sensitive device will stop the machine. If the machine should get out of order due to a change in tension of the friction drive for the bobbin, or the machine is caused to run abnormally slow, or improper traction is obtained, the result is that the speed of movement of the cord is reduced and the machine will be stopped. Again, a loose tension on the bobbin or slip between the capstan and the cords will reduce the speed of feeding of the cords and therefore stop the machine. It may therefore be seen that anything which tends to reduce the speed of movement of the fibers fed into the machine will cause the speed sensitive device to operate to stop the machine. This is true regardless of what machine is being controlled and what fiber is being fed into the machine.

In this invention the speed sensitive device is applied to use in combination with a former and twister comprising a frame 10 supporting a flyer 11 which in turn supports a capstan 12. A bobbin 13 receives the rope from the capstan 12 and is also carried within the flyer 11.

The flyer 11 is driven by a gear 14 meshing with a driven gear 15 carried upon a drive shaft 16. The drive shaft 16 is suitably connected to a pulley 17 driven by the belt 18. The pulley 17 consists of a drive pulley 19 and an idler pulley 20, the use of which will be hereinafter described.

A plurality of spools of cord 21 is carried upon a suitable frame 22 for supplying cords to the forming and twisting machine. Each of the cords from the individual spools 21 passes over a sheave forming the speed sensitive device to be hereinafter more fully described.

As shown in this invention three cords enter the forming and twisting machine. Each of the cords passes over a speed sensitive device 25 which is supported upon a common axle extending from the head 26 of the frame 22. The speed sensitive devices 25 are thus each responsive to the rate of movement of the cord passing thereover and either of the devices can operate to stop the former and twister when the movement of either of the cords falls below a predetermined rate of movement, or if it should break.

Figure 2:
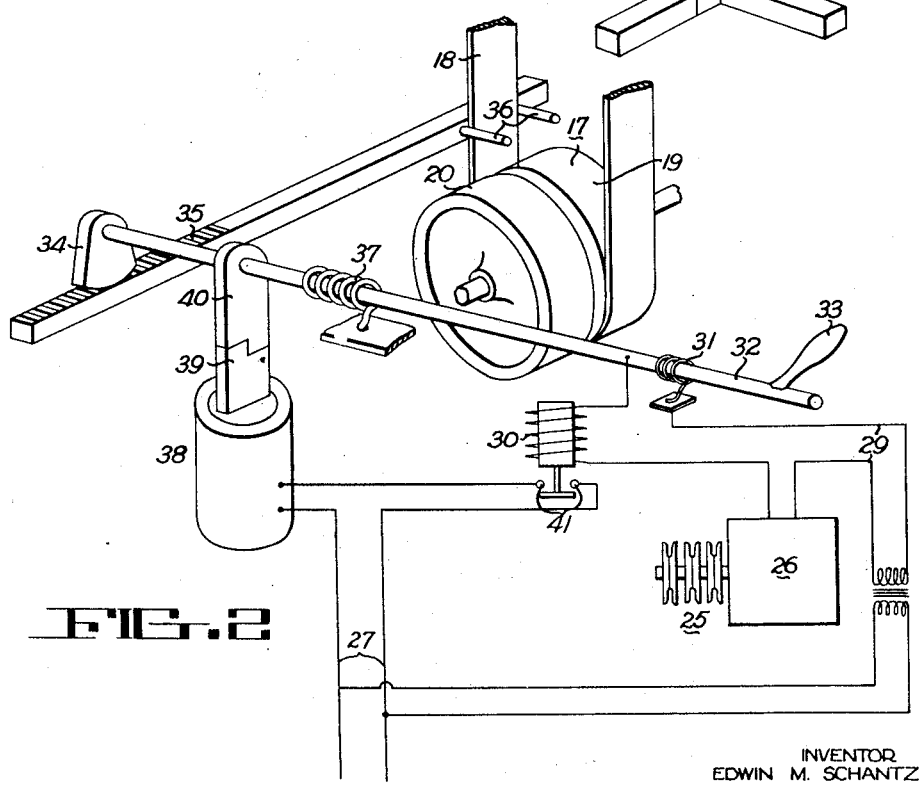
Figure 2 is a schematic view of the control apparatus and the electrical system for the same for stopping operation of the cordage machine.

Each of the speed sensitive devices 25 of this invention has a mechanism for making an electric circuit when the speed of the device is below a predetermined amount. The speed sensitive devices operate independently of one another but are connected electrically in parallel so that any one of the devices can operate an electric relay. As shown in Figure 2, the electrical system for controlling the former and twister of Figure 1 consists of a plurality of the speed sensitive devices 25 to be hereinafter more fully described. An electric circuit is provided to the speed sensitive devices 25 from the power lines 27 through the transformer 28. The transformer 28 reduces the voltage from the power lines 27 to produce a low voltage circuit 29. The speed sensitive devices are in the low voltage circuit 29 and each of the devices is in series electrically with a relay 30. An electric switch 31 is provided in the low voltage circuit 29 for making and breaking circuit when rotated by the actuating rod 32.

The actuating rod 32 is suitably supported upon the frame 10 of the forming and twisting machine and has a handle 33 at one end thereof and a gear segment 34 at the opposite end. The gear segment 34 engages a rack 35 which extends adjacent the drive belt 18. The rack 35 carries a pair of pins 36 which are disposed upon opposite sides of the belt 18. A torsion spring 37 surrounds the actuating rod 32 for normally retaining the rod in the position shown in Figure 2 with the drive belt 18 in engagement with the drive pulley 17. When the actuating rod 32 is rotated the gear segment 34 reciprocates the rack 35 to cause the pins 36 carried thereby to shift the belt 18 from the drive pulley 17 to the idler pulley 20, thereby stopping operation of the machine.

An apparatus is provided for automatically shifting the belt 18 from the pulley 17 to the pulley 20 when any one of the speed sensitive devices makes electric contact in a manner to be hereinafter described.

This apparatus consists of an electric solenoid 38 having an armature 39 which engages a latch 40 secured to the actuating rod 32. The armature 38 is in series electrically with the contacts 41 of the relay 30. The contacts 41 are in series electrically with the power lines 27.

When any one of the speed sensitive devices falls below a predetermined R. P. M. electric circuit is closed therein to permit current to flow to the relay 30. The relay 30 closes the contacts 41 to conduct current to the solenoid 38 to energize the same. The armature 39 is pulled downwardly by energization of the solenoid 38 to release the latch 40 and thereby permit the torsion spring 37 to rotate the actuating rod 32 and shift the belt 18 from the drive pulley 17 to the idler pulley 20, thereby stopping the machine. When the actuating rod 32 is rotated the electric circuit is broken through the switch 31, whereby the solenoid 38 is deenergized and the contacts 41 are opened to deenergize the solenoid 38. The machine will not start however until the belt 18 has been returned to the drive pulley 17.

Upon correction of the trouble in the machine the rod 32 is rotated in a reverse direction by the handle 33 to manually shift the belt 18 to the drive sheave 17. Since the speed sensitive devices 25 are responsive solely to the movement of fibers to the machine it can be seen that any faulty operation of the machine which tends to slow down the movement of the fibers into the machine will stop the machine until the faulty operation is corrected.

Each of the speed sensitive devices 25 is identical in construction and therefore a description of one of the devices will suffice for all of them.

Figure 3:
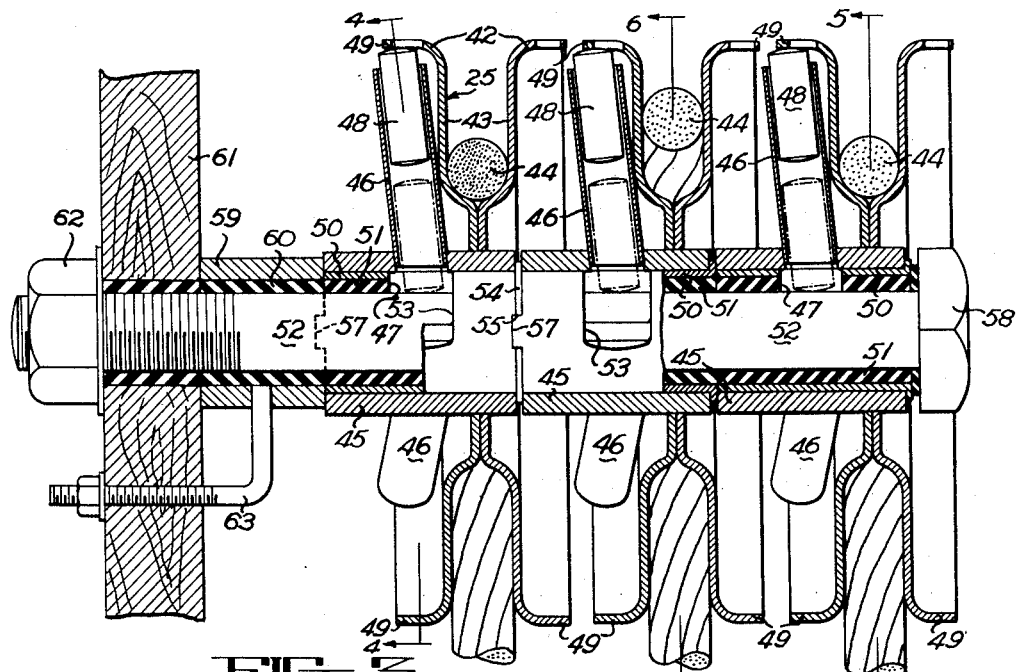
Figure 3 is a longitudinal cross-sectional view taken substantially along line 3—3 of Figure 4.
Figure 5:
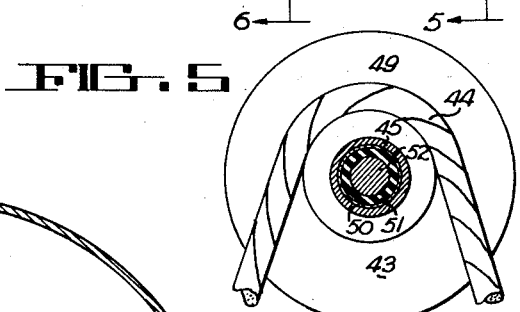
Figure 5 is a transverse cross-sectional view taken along line 5—5 of Figure 3 showing the driving position of the rope in the sheave.
Figure 4:
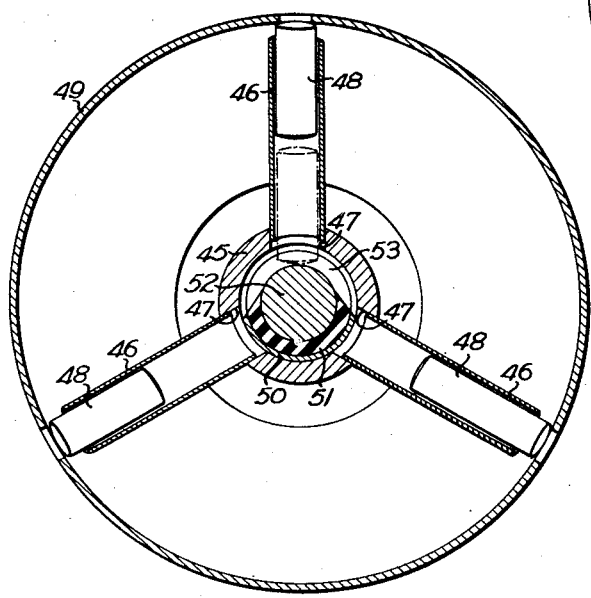
Figure 4 is a transverse cross-sectional view taken substantially along line 4—4 of Figure 3.
Figure 6:
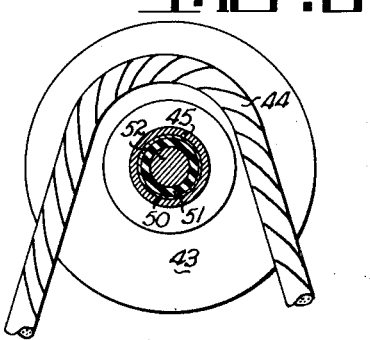
Figure 6 is a cross-sectional view taken along line 6—6 of Figure 3 showing the position of the rope in the sheave caused by vibration of the rope therein.

As shown in Figure 3, the speed sensitive device 25 consists of a sheave 42 having parallel side walls 43 to receive a strand of fiber, cord, or the like, 44. The sheave 42 is secured to a hub 45 by a suitable operation, such as welding. A plurality of tubes 46 extends radially from the hub 45 toward the outer perimeter of the sheave 42. These tubes (as shown in Figure 4) are spaced 120° apart. The tubes 46 are secured to the hub 45 within holes 47 provided radially in the hub 45. A cylindrical metal plunger 48 is placed within each of the tubes 46 and is prevented from leaving the tube 46 by means of an annular flange 49 extending from the side walls 43 of the sheave 42.

The hub 45 of the sheave 42 is carried upon a bearing sleeve 50 which is supported upon an insulating sleeve 51 positioned upon an axle shaft 52.

The bearing sleeve 50 and the insulating sleeve 51 have an arcuate portion removed therefrom to provide an opening 53. The opening 53 exposes the axle shaft 52 to the interior of the tubes 46 so that the plunger 48 can engage the axle shaft 52 under certain conditions of operation to be hereinafter described.

One of the speed sensitive devices 25 is provided for each cord which enters the forming and twisting machine and, as shown in this invention, three of the speed sensitive devices cooperate to control the cords which enter the machine to make a single rope strand. The plurality of speed sensitive devices 25 is thus mounted upon the axle shaft 52 in adjacent relationship, but each is free to turn or revolve upon its respective bearing surface 50. The bearing sleeve 50 of the speed sensitive 25 is provided with a flange 54 disposed adjacent one end of the hub 45. The flange 54 has a notch 55 positioned on opposite sides of the annular flange 54 and disposed 180° apart. The body of the bearing sleeve 50 receives a corresponding notch 56 adjacent the notch 55. Ears 57 extend from the end of the bearing sleeve 50 for engaging the notch 56 in the bearing sleeve thereadjacent as shown in Figure 9. This arrangement thus locates opening 53 of each of the bearing sleeves 50 in a positive position with respect to the opening in adjacent bearing sleeves.

The axle shaft 52 extends through all of the insulating sleeves 51 and has a head 58 on one end thereof which engages the flange 54 of the outermost bearing sleeve 50 (as shown in Figure 3). The innermost bearing sleeve of the assembly shown in Figure 3 has the ears 57 thereof in engagement with notches provided in the sleeve 59. The sleeve 59 is insulated from the axle shaft 52 by an insulating sleeve 60. The axle shaft 52 extends through a supporting panel 61 which is a wall of the head 26 of the frame 22, disclosed in Figure 1. A nut 62 is threaded upon the end of the axle shaft 52 to draw all of the bearing sleeves into engagement with one another and secure the sleeve 59 in position adjacent the wall 61.

The assemblies thus described permit individual rotation of the speed sensitive devices 25 upon their individual bearing sleeves so that they are entirely independent in their operation.

A stud 63 is secured to the sleeve 59 and provides means for connecting an electric wire from one side of the electric circuit to the speed sensitive devices 25. The wire from the opposite side of the electric circuit is connected to the axle shaft 52. It may thus be seen that an electric circuit may be completed through the speed sensitive devices when any one of the plungers 48 is in engagement with the axle shaft 52, the circuit being through the stud 63, the sleeve 59, the hub 45, the tube 46, the plunger 48 and the axle shaft 52.

When the speed sensitive device 25 is thus placed in the electric circuit previously described with Figure 2 it may be seen that each time an electric circuit is completed through the speed sensitive device that operation of the electric mechanism of Figure 2 is controlled to cause the machine to stop.

The speed sensitive device 25 is a centrifugally responsive mechanism. The plungers 48 are loosely positioned within the tubes 46 so that when the speed sensitive device 25 is rotating at or above a predetermined speed the plungers 48 will be in their extreme outward positions in the tube 46 (as shown in full lines in Figures 3 and 4). Under these circumstances the electric circuit through the speed sensitive device is broken and will remain broken as long as the speed sensitive device is rotated at or above the predetermined speed. When the speed of rotation of the speed sensitive device falls below a predetermined speed, or stops entirely, the plungers 48 may drop within the tubes 46. Depending upon the position of the respective tubes 46 one or more of the plungers will drop when the speed sensitive device 25 stops. As shown in Figures 3 and 4, the plunger 48 in the tube vertically positioned above the axle shaft 52 can drop as shown in the dot-dash lines. When this plunger drops electric circuit will be made through the speed sensitive device as heretofore described.

If the speed sensitive device is rotating but at a speed lower than that normally desired, the plungers 48 in the tubes 46 will drop successively as they are rotated about the axle shaft 52 and will maintain a continuous electric circuit as long as they are rotating since the insulating sleeve 51 is cut away in a manner to permit such a continuous circuit through the axle shaft 52. As shown in Figure 7, when two of the tubes 46 are disposed above the center of the axle shaft 52, one of the plungers 48 will make contact with the axle shaft before the other plunger leaves the axle shaft regardless of the direction of rotation of the speed sensitive device. Therefore, it can be seen that even if the speed sensitive device merely slows down that a circuit will be made to cause the machine controlled thereby to stop.

To control the coasting period of the speed sensitive devices between breakage of a fiber and the dropping of the plungers 48, one of the plungers 48 can be made longer, as shown in Figure 4, and thus heavier than the others to impart a certain off-balance to the sheave whereby friction is created between the bearing sleeve 50 and the hub 45 to act as a brake for the device.

There may be times when it is not desirable to use all of the speed sensitive devices. Under these conditions it is desirable to lock out the inoperative speed sensitive device so that it cannot make circuit and thus stop operation of the machine controlled by the active speed sensitive devices. To lock the inoperative speed sensitive device out of the electric circuit the bolt 62 of the axle shaft 52 is loosened to permit the insulating sleeve 51 to be rotated 180° into the position shown in Figure 8. The position of Figure 8 represents the insulating sleeve on the upper side of the axle shaft 52. The nut 62 can then be tightened and the active devices will function in the same manner as heretofore described regardless of the position of the plungers in the inactive device since they cannot make contact with the axle shaft 52.

When feeding certain types of cord to a machine, and particularly to a forming and twisting machine for manufacturing rope and like articles the cords have a tendency to gallop or vibrate upon the sheaves of the speed sensitive devices 25. Therefore, the sheaves 42 are provided with the parallel walls 43 heretofore described so that the cord can gallop or vibrate vertically within the sheaves without jumping from the sheaves. Under normal circumstances this action is very rapid so that the resultant driving force obtained upon the speed sensitive devices is sufficient to maintain them at the proper speed to hold the plungers 48 in the outward position in the tubes 46. The weight of the sheaves 42 is sufficient to act as a flywheel between the intervals of engagement of the cords with the bottom or driving surface of the sheaves 42.

Under certain circumstances the speed of rotation of the speed sensitive device may be just sufficient to retain the plungers 48 in their outward positions. If the cord or fibers were to leave the sheave for any reason sufficient speed loss may occur to permit one of the plungers 48 to drop and close circuit. This occurs particularly when a machine is changed over to manufacture a rope or cord of a different size from that for which the speed sensitive devices have been designed. To permit some variation in the size of cord that can be manufactured on a particular machine and to overcome the extreme sensitivity of the speed sensitive device under these conditions an electric circuit (as shown in Figure 16) is used. The electric circuit of this figure is similar to the electric circuit disclosed in Figure 2 in that current is supplied from power lines 64 to a transformer 65 and a solenoid 66. A relay 67 is in series with a low voltage circuit 68 from the transformer 65 and controls the power circuit to the solenoid 66. A relay 69 is placed in the low voltage circuit 68 and functions in the same manner as the switch 31, disclosed in the circuit of Figure 2. The elements of the circuit thus far described with regard to Figure 16 function with regard to the circuit of Figure 2. However, the solenoid 67 in Figure 16 is energized by a relay 69 controlled in its opening and closing movement by means of a dash-pot 70. The relay solenoid 69 is in series with the electric circuit through a speed sensitive device 25.

Under conditions of momentary contact of the plunger 48 with the axle shaft 52 of the speed sensitive device 25, due to conditions just described, the machine controlled by the speed sensitive device 25 will not be stopped since the dash-pot 70 interposes a time delay before the contacts 71 are bridged. Therefore, if the speed sensitive device closes contact momentarily, and a fault of machine is not present, the machine will not stop but if there is an actual fault of the machine the plunger 48 will remain in a contact with the axle shaft 52. After a delay time period the dash-pot 70 will permit the contact 71 to be bridged and thereby stop the machine in the same manner as heretofore described with regard to Figure 2.

In Figures 10 and 11 there is shown a modified structure of the speed sensitive device. In this modification an insulating sleeve 75 is placed upon the axle shaft 76. A metal sleeve 77 is placed upon the insulating sleeve 75 and has one end thereof abutting against an insulating washer 78 disposed against the head 79 of the axle shaft 76. The insulating sleeve 75 and the axle shaft 76 is provided with holes to receive a pin 80 which extends through the axle shaft 76 and projects from each side thereof. The metal sleeve 77 has a hole 81 substantially larger than the diameter of the pin 80 to prevent contact of the metal sleeve with the pin 80.

An insulating sleeve 82 is placed upon the metal sleeve 77 and abuts against the pin 80. A bearing sleeve 83 is placed upon the insulating sleeve 82 and also abuts against the pin 80. An annular ring 84 is disposed between insulating washers 85. The ring 84 and the washers 85 are then placed upon the sleeve 77 in abutting relationship to the bearing sleeve 83. An insulating sleeve 86 is placed upon the sleeve 77 in abutting relationship to the washers 85 and a bearing sleeve 87 is placed upon the insulating sleeve 86.

The bearing sleeves 83 and 87 provide a bearing surface for a hub 88 of the speed sensitive device. The hub 88 carries a sheave 89 secured thereto in any suitable manner and has a plurality of holes 90 each of which receives a tube 91 which extends radially from the hub 88. Plungers 92 are provided in the tubes 91 to make contact between the tubes 91 and the annular ring 84.

The description just made applies to the assembly and construction of a single speed sensitive device. However, any number of speed sensitive devices can be placed upon a common axle shaft by a process of assembly in the manner just described. Each of the speed sensitive devices will function independently of the others for controlling the flow of electric current therethrough.

After the last speed sensitive device has been assembled upon the axle shaft 76 an insulating washer 93 is placed in abutting relationship with the bearing sleeve 87 of the last assembled structure and the hub 88 of this structure. A metal washer 94 is then disposed between the insulating washer 93 and an insulating washer 95. The washer 94 engages the sleeve 77 whereby electric current can be conducted from any of the rings 84. The opposite side of the electric circuit is provided by the axle shaft 76, the pins 80 and the hubs 88. The plungers 92 provide the means for making circuit between the opposite sides of the circuit in the same manner as heretofore described.

The function of the apparatus just described is identical with the function of the apparatus described with regard to Figures 3 and 4 and the apparatus can be used in the same manner as the aforedescribed apparatus.

The apparatus previously described has particular meritorious use in connection with forming and twisting machines and any other apparatus to which there is fed a continuous stream of material, such as a cord, having sufficient strength to be passed over a sheave to drive the same. However, there are applications wherein the material is either not disposed in a manner to permit the use of sheaves, or is of such a nature that sheaves would impair the value of the material, or is too weak to drive a sheave.

When substances of this nature are found the apparatus disclosed with regard to Figures 13 and 14 is particularly useful. The function and operation of the apparatus is identical with the function and operation of the apparatus heretofore described in that the device maintains open electric circuit as long as the device is rotating at a normal and proper speed and will close circuit whenever the speed of operation of the device falls below normal. The device of Figures 13 and 14 is a light weight apparatus which can be supported by substances which have very little tensile strength, such as the sliver entering a spinner for producing individual cords or threads.

The apparatus of this modification consists of a roller of disc 96 formed from insulating material. A plurality of cups 97 is embedded in the surface of the roller 96. These cups are disposed 120° apart about the circumference of the roller.

Each of the cups 97 consists of a pair of metal cup members 98 and 99 which are joined by means of a cylindrical insulating member 100. A contact 101 extends inwardly from the cup member 98 in a manner that the end of the contact 101 is sufficiently close to the bottom wall of the cup member 99 that a globule of mercury 102 will span the space between the cup and the contact to form an electric circuit.

Whenever the roller 96 is rotating at a proper and desired speed the globule of mercury 102 will be located within the top portion of the cup, thereby breaking electric circuit through the device.

The roller 96 is carried between a pair of shafts 103 and 104 which are bearinged in bearing blocks 105 and 106 carried at opposite ends of a support member 107. The bearing block 105 is hinged to a part of the frame 108 of the machine upon which the device is located. Electric current is carried to and from the mercury switches through the shafts 103 and 104 by a suitable means for engaging the respective axle shafts, such as the contactor 109.

The apparatus just described has particular merit when used upon a spinner or jenny to indicate the rate of travel of the sliver to the machine. The sliver, travelling in somewhat of a belt-like form through the machine, is relatively low in tensile strength, but the light weight apparatus heretofore described can be supported by the sliver. The device would normally be disposed between the conveyor belt of the spinner or jenny and the inlet throat of the spinning machine proper so that if the belt of the sliver should break the machine will be immediately stopped.

Also, if the sliver should not be fed to the machine at a proper normal speed the roller 96 will not have sufficient peripherial speed to maintain the globule of mercury in the upper portion of the cup, whereby the mercury will drop and make contact between the cup 99 and the contact 101. When the electric circuit is made an electric solenoid or like apparatus will be operated to stop the machine.

Figure 15 discloses the use of the modified apparatus shown in Figures 13 and 14 as supplied to a drawing frame. In this modification the speed sensitive device disclosed in Figures 13 and 14 is carried upon the fibers passing through the machine and the device is disposed in front of the feeding drums or wheels. In this application of the device the fibers passing through the machine extend across an open space in advance of the feeding wheels so that if the belt of fiber should break or move at too slow a rate of speed, the speed sensitive device will operate to stop the machine in the manner heretofore described.

In Figure 12 there is shown an apparatus for stopping a forming and twisting machine when the bobbin is full. The flyer 11 carries the usual capstan 12 which is rotated with the flyer 11 and is driven at a suitable differential speed by means of the gears 110. The plurality of cords entering the machine are twisted by the capstan and then pass over the capstan in a twisted condition. The capstan 12 draws the cords through the throat of the former and the twisted cord leaves the capstan to pass over the pulleys 111 to the bobbin 13. The bobbin 13 is driven through a friction drive apparatus which is constructed and arranged in the usual manner to slip continuously so that as the layers of cord are wound upon the bobbin the peripherial speed of the bobbin will be maintained uniform to take up the cord as drawn from the source by the capstan.

As previously described, if friction on the bobbin should increase, its speed of rotation will reduce and therefore it cannot take the cord as fast as fed by the capstan. The cord will become loose on the capstan and will thereby slip upon the same so that the capstan will not draw cord from the spools 21 (see Figure 1) at the normal rate whereby the speed of the speed sensitive device is reduced to the point that the machine will stop.

To apply additional friction upon the bobbin when it is full the applicant places a finger 112 upon one of the support rods 113 of the flyer 11. The end of the finger 112 is disposed adjacent the bobbin 13 so that when the last layer of cord is wound upon the bobbin the finger 112 will engage the cord layer, thereby increasing the friction on the bobbin and reducing its speed with the ultimate result of stopping the machine.

In Figures 17 and 18 there is shown another modified structure of the speed sensitive device. In this modification the axle shaft, the bearing rings, the hub for the sheave and the sheave are constructed in the same manner as described with regard to Figures 10 and 11. The elements of Figures 17 and 18, which are identical with the elements of Figures 10 and 11, therefore carry the same reference numeral with the suffix "a."

The centrifugally operated switch of Figures 17 and 18 differs from the centrifugally operated switch of Figures 10 and 11 in that the switch is constructed in the manner of a centrifugally operating governor.

The centrifugally operated switch of Figures 17 and 18 consists of arms 114 and 115 pivoted upon the pins 116 and 117 respectively. Arms 118 and 119 are pivotally secured to arms 114 and 115 respectively by the pivot pins 120 and 121 respectively. The arm 118 is also pivotally connected to the arm 115 by a pivot pin 122 which carries a weight 123. The arm 119 is pivoted to the arm 114 by a pivot pin 124 which carries a weight 125. The structure thus described is rectangular and is collapsible about the pivots 116 and 117.

A tension spring 126 has one end thereof secured to the pivot pin 122 and the opposite end to a stationary pin 127 secured to the sheave 89a. A tension spring 129 has one end thereof secured to the pivot pin 124 and the opposite end secured to a stationary pin 130 carried by the sheave 89a. The springs therefore tend to normally collapse the triangular structure formed by the arms. The arm 118 carries a spring contact 131, while the arm 119 carries a spring contact 132.

When the tension springs 129 collapse the rectangular structure the contacts 131 and 132 engage the annular ring 84a to cause circuit through the device in the same manner as heretofore described with regard to Figures 10 and 11.

When the device is operating at a normal speed the weights 123 and 125 will retain the contacts 131 and 132 out of engagement with the annular ring 84a, whereby the device will not produce any operation of the machine as long as the material being fed to the machine maintains the device at the proper speed of rotation.

In Figure 19 the speed sensitive device of this invention is shown as applied to a wheel which is driven by a moving liquid. The speed sensitive device of this arrangement is identical with the speed sensitive device disclosed in Figure 3, except that in this instance, the device is carried by a wheel rather than by a sheave.

The speed sensitive devices 25a may have the tubes 46a carried upon the spokes 133 of the wheel 134. The wheel 134 is suitably supported upon the axle 52a in the same manner as the sheave 42 of Figure 3. The periphery of the wheel 134 carries extensions 135 which are adapted to be engaged by a body of liquid 136 flowing adjacent the wheel 134 to rotate the same.

As long as the body of liquid 136 maintains rotation of the wheel at or above a normal speed the speed sensitive device 25a will not close electric circuit. The electric circuit through the speed sensitive device 25a can control any machine to which the fluid is flowing or can control any machine or apparatus depending upon the supply of fluid 136 for its operation.

In Figure 20 the speed sensitive device is applied to a propeller fan. In this modification, the speed sensitive device is identical with that disclosed in Figure 3, except that the tubes 46b of the speed sensitive device 25b are located within the blades of the propeller fan 137. The propeller fan 137 is driven by a current of air passing over the fan through a suitable duct 138. The axle shaft of the propeller fan 137 is provided by an axle 52b of the speed sensitive device 25b, the hub 45b rotating freely thereon in the same manner as disclosed in Figure 3.

The speed sensitive device of Figure 20 operates in this application in the same manner as heretofore described with regard to the speed sensitive device of Figure 3 except that the device is now responsive to a flow of air across the propeller fan rather than being responsive to the movement of a cord.

Having thus fully described my invention, what I claim as new and desire to secure by Letters Patent is:

1. A speed sensitive device for controlling an electric circuit comprising an axle, means on said axle electrically insulated therefrom and freely rotatable thereon, said axle and said means forming part of an electric conducting circuit, and means responsive to the speed of said rotatable means for engaging said axle for completing electric circuit between said axle and said rotatable means when said rotatable means is stopping.

2. A controller for a fiber working machine comprising sheave means for directing the flow of fibers to the machine, said sheave means being driven by the engagement of fibers flowing to the machine, a centrifugally operated electric switch carried by said sheave means having open circuit therethrough when the flow of fibers is at a predetermined speed, said switch closing circuit therethrough when the flow of fibers is below the predetermined speed, and means actuated by said switch means upon closing circuit thereof for stopping the fiber working machine.

3. A centrifugally operated controller for a fiber working machine comprising rotatable means supported and driven by fibers flowing to the machine, a centrifugally operated electric switch carried by said rotatable means having open circuit therethrough when the flow of fibers is at a predetermined speed, said switch closing circuit therethrough when the flow of fibers is below the predetermined speed, and means actuated by said switch means upon closing circuit thereof for stopping the fiber working machine.

4. An electric controller comprising a shaft, an insulating member surrounding said shaft having an opening therein, means freely rotatable upon said insulating member, guide means carried by said last mentioned means, and plunger means freely reciprocable on said guide means and adapted to engage said shaft when said rotatable means is rotated below a predetermined speed.

5. An electric circuit controller for a cordage machine comprising means rotated by movement of fiber to the cordage machine, and electric mercury switch means carried by said rotated means, the mercury of said switch means being caused to move by the action of centrifugal force thereon for making electric circuit when said rotated means is operated below a predetermined speed.

6. An apparatus for controlling a cordage machine comprising a belt shifting apparatus for moving a drive belt between a drive pulley and an idler pulley, rotatable means engaged by fiber moving to the machine and rotated by said moving fiber, centrifugally operated switch means carried by said rotated means for making circuit when said rotated means is below a predetermined speed, and means actuated by said switch means for permitting operation of said belt shifting apparatus.

7. A centrifugal electric controller comprising a stationary shaft, an insulating sleeve surrounding said shaft having an arcuate opening therein, a pulley having a hub supported upon said sleeve and freely rotatable thereupon, a plurality of tubes extending substantially radially of said pulley from radial opening in said hub, and plunger means freely reciprocable in said tubes adapted to engage said shaft through said openings in said hub and said sleeve when said pulley is rotated below a determined speed.

8. A centrifugal electric controller comprising a shaft, an insulating member surrounding said shaft having an opening therein, a pulley freely rotatable upon said insulating member, a plurality of tubes extending substantially radially of said pulley, and plunger means freely reciprocable in said tubes adapted to engage said shaft through said opening when said pulley is rotated below a determined speed, at least one of said plungers having a weight greater than the remaining plungers to create an off-balance and thus control the free coasting time of said pulley.

9. A centrifugal electric controller comprising a stationary shaft, an insulating sleeve surrounding said shaft having an arcuate opening therein, a pulley having a hub supported upon said sleeve and freely rotatable thereupon, a plurality of tubes extending substantially radially of said pulley from radial openings in said hub, and plunger means freely reciprocable in said tubes adapted to engage said shaft through said openings in said hub and said sleeve when said pulley is rotated below a determined speed, said insulating member being rotatable upon said shaft to position said opening in a location that said plunger cannot engage said shaft by gravity contact thereof.

10. An apparatus for stopping the operation of a fiber working machine comprising a mechanism adapted to start and stop the machine, electric switch means, speed responsive means driven by the engagement of fibers flowing from a supply means to the machine for normally holding an open electric circuit through said switch means when the flow of the fibers to the machine is at or above a predetermined speed, and means energized by said switch means when the flow of the fibers to the machine is below a predetermined speed for immediately actuating said starting and stopping mechanism to stop the machine.

11. A centrifugally operated electric controller comprising a shaft, means freely rotatable upon said shaft, a collapsible rectangular lever structure carried by said rotatable means, electric contact means carried by said collapsible structure, a contact ring carried by said shaft and insulated therefrom, and means normally retaining said contact means in engagement with said contact ring.

12. An apparatus for stopping the operation of a cordage machine comprising centrifugally operated electric switch means actuated by the engagement of fibers moving to the machine, means in the machine for receiving the fibers, and means actuated by the quantity of fibers on said receiving means for reducing the speed of operation of said receiving means to reduce the speed of flow of fibers thereto and thereby cause actuation of said centrifugally operated switch to stop the machine.

13. In a cordage machine a flyer, a capstan, a bobbin for receiving the cord, means actuated by the quantity of cord on said bobbin for reducing the speed of operation of said bobbin, and centrifugally operated electric switch means engaged by the fibers moving to the capstan and actuated by the speed of movement of said fibers to said capstan for causing said machine to stop when the speed of rotation of said bobbin is reduced thus reducing the speed of movement of said fibers.

14. An apparatus for stopping a drawing frame comprising rotatable means supported by the sliver passing through the drawing frame and rotated thereby, electrically energized means for stopping the drawing frame, and a plurality of electric switches actuated by said rotatable means in response to the speed of rotation thereof for making electric circuit to actuate said stopping means when the sliver breaks.

15. A controller for a fiber working machine comprising means drivingly rotated by the engagement of fibers flowing to the machine, centrifugally operated electric switch means carried by said rotated means, and means actuated by said switch means for stopping the fiber working machine.

16. A controller for a fiber working machine comprising means driven by the engagement of fibers flowing from a supply means to the machine, speed responsive means actuated by said driven means, and means for stopping the fiber working machine actuated by said speed responsive means.

EDWIN M. SCHANTZ.